United States Patent
Cho et al.

(10) Patent No.: US 8,052,939 B2
(45) Date of Patent: Nov. 8, 2011

(54) MICRO CHANNEL REACTOR SYSTEM

(75) Inventors: Jun Yeon Cho, Daejeon (KR); Jung Uk Choi, Daejeon (KR); Jae Hoon Choe, Daejeon (KR); Kwang Cheon Park, Daejeon (KR); Chang Houn Rhee, Daejeon (KR); Sun Hyuk Bae, Daejeon (KR); Kwang Ho Song, Sungnam-si (KR)

(73) Assignee: LG Chem, Ltd., Seoul (KR)

( * ) Notice: Subject to any disclaimer, the term of this patent is extended or adjusted under 35 U.S.C. 154(b) by 229 days.

(21) Appl. No.: 12/227,685

(22) PCT Filed: May 29, 2007

(86) PCT No.: PCT/KR2007/002601
§ 371 (c)(1),
(2), (4) Date: Aug. 27, 2009

(87) PCT Pub. No.: WO2007/139336
PCT Pub. Date: Dec. 6, 2007

(65) Prior Publication Data
US 2010/0015016 A1    Jan. 21, 2010

(30) Foreign Application Priority Data
May 29, 2006  (KR) .................. 10-2006-0048237

(51) Int. Cl.
*B01J 19/00* (2006.01)
*B01J 8/00* (2006.01)
*B01J 10/00* (2006.01)
*B01J 8/04* (2006.01)

(52) U.S. Cl. ........ 422/198; 422/129; 422/130; 422/600; 422/602; 422/603; 422/630

(58) Field of Classification Search .................. 422/129, 422/130, 198, 200, 600, 602, 603, 630
See application file for complete search history.

(56) References Cited

U.S. PATENT DOCUMENTS

| 5,270,127 A * | 12/1993 | Koga et al. .................... 429/420 |
| 7,048,897 B1 | 5/2006 | Koripella et al. |
| 2002/0071797 A1 | 6/2002 | Loffler et al. |
| 2005/0193628 A1 | 9/2005 | Kim et al. |

* cited by examiner

*Primary Examiner* — Walter Griffin
*Assistant Examiner* — Natasha Young
(74) *Attorney, Agent, or Firm* — McKenna Long & Aldridge LLP

(57) ABSTRACT

The present invention discloses to a channel reactor system having a first channel plate assembly in which an exothermic reaction is performed and a second channel plate assembly provided for heat-exchanging and constituted integrally with the first channel plate assembly so as to remove effectively heat, the channel reactor system comprising at least two channel units into which reaction gas and cooling fluid are separately introduced, each channel unit comprising a reaction channel plate assembly into which reaction gas is introduced and a heat-exchanging channel plate assembly into which cooling fluid is introduced; and at least one intermediate plate disposed between the upper and lower channel units, the intermediate plate supplying reaction gas and cooling fluid inflowed from the upper channel unit with new reactant and cooling fluid and supplying reaction gas and cooling fluid to the reaction channel plate assembly and the heat-exchanging channel plate assembly of the lower channel unit, respectively.

12 Claims, 3 Drawing Sheets

MICRO CHANNEL REACTOR SYSTEM

This application is a 371 national stage entry of International Application No. PCT/KR2007/002601, filed on May 29, 2007 that claims priority to Korean Patent Application No. 10-2006-0048237, filed on May 29, 2006, both of which are hereby incorporated by reference in their entirety.

TECHNICAL FIELD

The present invention relates to a micro channel reactor system, more particularly, to a micro channel reactor system for multi-steps reaction, in particular, water-gas shift reaction, which can be miniaturized and has a structure by which heat can be effectively removed.

BACKGROUND ART

As interest in environmental problems has progressively increased in recent years, a study for fuel cell has been actively performed as the alternative to a gasoline engine and fossil fuel. To make the best use of the fuel cell, the various requirements for producing and/or supplying hydrogen used as raw material should be prepared.

Hydrogen is the lightest gas and may be exploded easily in the air. Due to the above properties of hydrogen, it is extremely difficult to handle and store hydrogen. Accordingly, a current level of technique is to supply hydrogen by merely using a hydrogen storage tank with a high capacity, the above technique has a drawback that it is difficult to solve completely the aforementioned problems by means of such hydrogen storage tank.

In addition, there is a problem that an initial facility investment expense is immensely required for developing the hydrogen storage tank with a high capacity and providing a hydrogen storage facility with a high capacity.

Accordingly, the method by which a volume and weight of the hydrogen generating equipment are reduced may be very preferable in that hydrogen can be used as clean energy without paying an immense facility investment expense.

In addition, to supply directly hydrogen generated in the miniaturized hydrogen generating equipment to the fuel cell, a content of carbon monoxide (CO) which impedes an activity of a cathode electrode of the fuel cell should be minimized.

That is, carbon monoxide in hydrogen-rich gas generated by a reforming reaction between steam and hydrocarbon fuel poisons platinum used as an electrode material of a proton exchange membrane fuel cell to lower rapidly a performance of the fuel cell.

The permissible concentration level of carbon monoxide which is suitable for preventing a poison of platinum caused by carbon monoxide is approximately 50 ppm or less. To generate carbon monoxide with a suitable concentration, a water-gas shift reaction process and a preferential CO oxidation reaction process are performed for hydrogen-rich gas.

After performing the water-gas shift reaction process, a concentration of carbon monoxide should be decreased to 1% or less, and after the preferential CO oxidation reaction process, a concentration of carbon monoxide should be decreased to 50 ppm or less.

A commercially available water-gas shift reaction is performed in two stages, that is, a high temperature water-gas shift reaction stage and a low temperature water-gas shift reaction stage, and may be represented by the following reaction formula:

$$CO + H_2O \rightleftharpoons CO_2 + H_2 \quad \Delta H = -41.1 \text{ kJ/mol} \qquad \text{[Reaction formula]}$$

$Fe_2O_3/Cr_2O_3$ catalyst is used in the high temperature water-gas shift reaction performed at a temperature of 350 to 450° C., and the low temperature water-gas shift reaction in which Cu/ZnO is used as catalyst is performed at a temperature of 200 to 300° C.

Accordingly, the system for performing the high temperature water-gas shift reaction and the system for performing the low temperature water-gas shift reaction should be provided separately. A complicated heat-exchange system equipped with sophisticated temperature controlling devices is required for maintaining the appropriate temperature in the high and low temperature water-gas shift reaction system.

The two reaction systems mentioned above increase the overall size of the system. Moreover, the difficulty of controlling temperature leads to lower overall system stability.

In addition, the water-gas shift reactor system generally employs a fixed-bed reactor. This fixed-bed reactor can not remove effectively and completely heat generated when the water-gas shift reaction which is the exothermic reaction is performed, and so the fixed-bed reactor has a drawback that the uniform temperature distribution is not obtained. Due to the above drawback, the fixed-bed reactor has the problems that the expected life span of the catalyst is reduced and a shift ratio is decreased. Accordingly, the system that is capable of removing completely heat generated when a reaction is performed is required.

DISCLOSURE OF INVENTION

Technical Problem

The present invention is conceived to solve the aforementioned problems of a conventional water-gas shift reactor system, an object of the present invention is to provide a channel reactor system for water-gas shift reaction in which a channel plate assembly in which an exothermic reaction is performed and a heat-exchanging channel plate assembly in which heat is exchanged are constituted integrally with each other to obtain an excellent heat-removing effect.

Technical Solution

In order to achieve the above object, the channel reactor system according to the present invention comprises at least two channel units into which reaction gas and cooling fluid are separately introduced, each channel unit comprising a reaction channel plate assembly into which reaction gas is introduced and a heat-exchanging channel plate assembly into which cooling fluid is introduced; and at least one intermediate plate disposed between the upper and lower channel units, the intermediate plate supplying new reactant and cooling fluid to reaction gas and cooling fluid inflowed from the upper channel unit and supplying reaction gas and cooling fluid to the reaction channel plate assembly and the heat-exchanging channel plate assembly of the lower channel unit, respectively.

The channel reactor system according to the present invention further comprises an upper end plate being disposed on the uppermost channel unit to supply reaction gas to the reaction channel plate assembly and cooling fluid to the heat-exchanging channel plate assembly of the upper channel unit; and a lower end plate disposed below the lowermost channel unit, the lower end plate being provided for discharging reaction product discharged from the reaction channel plate assembly and discharging cooling fluid discharged from the heat-exchanging plate assembly of the lowermost channel unit.

Here, the intermediate plate comprises a first inlet port to which cooling fluid is introduced; a second inlet port to which reactant is introduced; a second fluid passage connecting the reaction channel plate assembly of the upper channel unit, the second inlet port and the reaction channel plate assembly of the lower channel unit; and a first fluid passage connecting the heat-exchanging channel plate assembly of the upper channel unit, the first inlet port and the heat-exchanging channel plate assembly of the lower channel unit.

In addition, the upper end plate, the intermediate plate and the lower end plate have a heating means mounted thereto.

In particular, each of the reaction channel plate assembly and the heat-exchanging plate assembly of the channel unit comprises a first channel plate and a second channel plate, each channel plate has a recess formed on an inner surface thereof and a plurality of elongated bars formed in the recess to form a plurality of fluid flow channels between the first and second channel plates by means of the elongated bars when the first and second channel plates are coupled to each other.

Also, each of the first and second channel plates of the reaction channel plate assembly has through holes formed on a periphery of the recess for passing cooling fluid and through holes formed on portions of the recess for inflowing and discharging reaction gas, and each of the first and second channel plates of the heat-exchanging channel plate assembly has through holes formed on a periphery of the recess for passing reaction gas and through holes formed on portions of the recess for inflowing and discharging cooling fluid.

The channel reactor system according to the present invention further comprises gaskets being placed between the first channel plate and the second channel plate of the reaction channel plate assembly and between the first channel plate and the second channel plate of the heat-exchanging channel plate assembly.

In the channel reactor system according to the present invention, the first and second channel plates of the reaction channel plate assembly have catalyst layers formed on inner surfaces thereof. Reaction gas supplied into the reaction channel plate assembly is reforming gas for the water-gas shift reaction, and the catalyst layer is water-gas shift catalyst layer and is formed of cerium (Ce)-zirconium (Zr) oxide catalyst containing platinum of 1 to 2 wt % and rhenium (Re) of 1 to 2 wt %.

Advantageous Effects

Since the water-gas shift reaction is performed in the channel reactor system according to the present invention as described above, a heat-exchange and a control of heat can be easily performed. And, since the channel reactor system according to the present invention has the structure that the heat-exchanging channel plate assembly is disposed adjacently to the reaction channel plate assembly, there is no need to provide an additional member such as a pipe for coupling a cooling means to the reactor so that a thermal efficiency of the system can be remarkably enhanced.

In particular, the heat-exchanging plate assembly is disposed such that the heat-exchanging plate assembly is contacted with the reaction channel plate assembly, so that heat generated in the exothermic reaction can be effectively removed. Along with the above structure, by disposing in stack the upper end plate, the first channel unit, the intermediate plate, the second channel unit and the lower end plate, it is possible to obtain the effect that a size (volume) of the system can be significantly reduced.

BRIEF DESCRIPTION OF DRAWINGS

The above and other objects, features and advantages of the present invention will become apparent from the following description of preferred embodiment given in conjunction with the accompanying drawings, in which.

BEST MODE FOR CARRYING OUT THE INVENTION

Hereinafter, the preferred embodiment of the present invention will be described in more detail with reference to the accompanying drawings.

On the other hand, the reactor system according to the present invention can be utilized for the various multi-steps reaction processes such as the water-gas shift reaction process, the preferential CO oxidation reaction process, the reaction process for producing aldehydes and the like. As one example, however, the reactor system utilized for the water-gas shift reaction process is described below.

Figure 1:
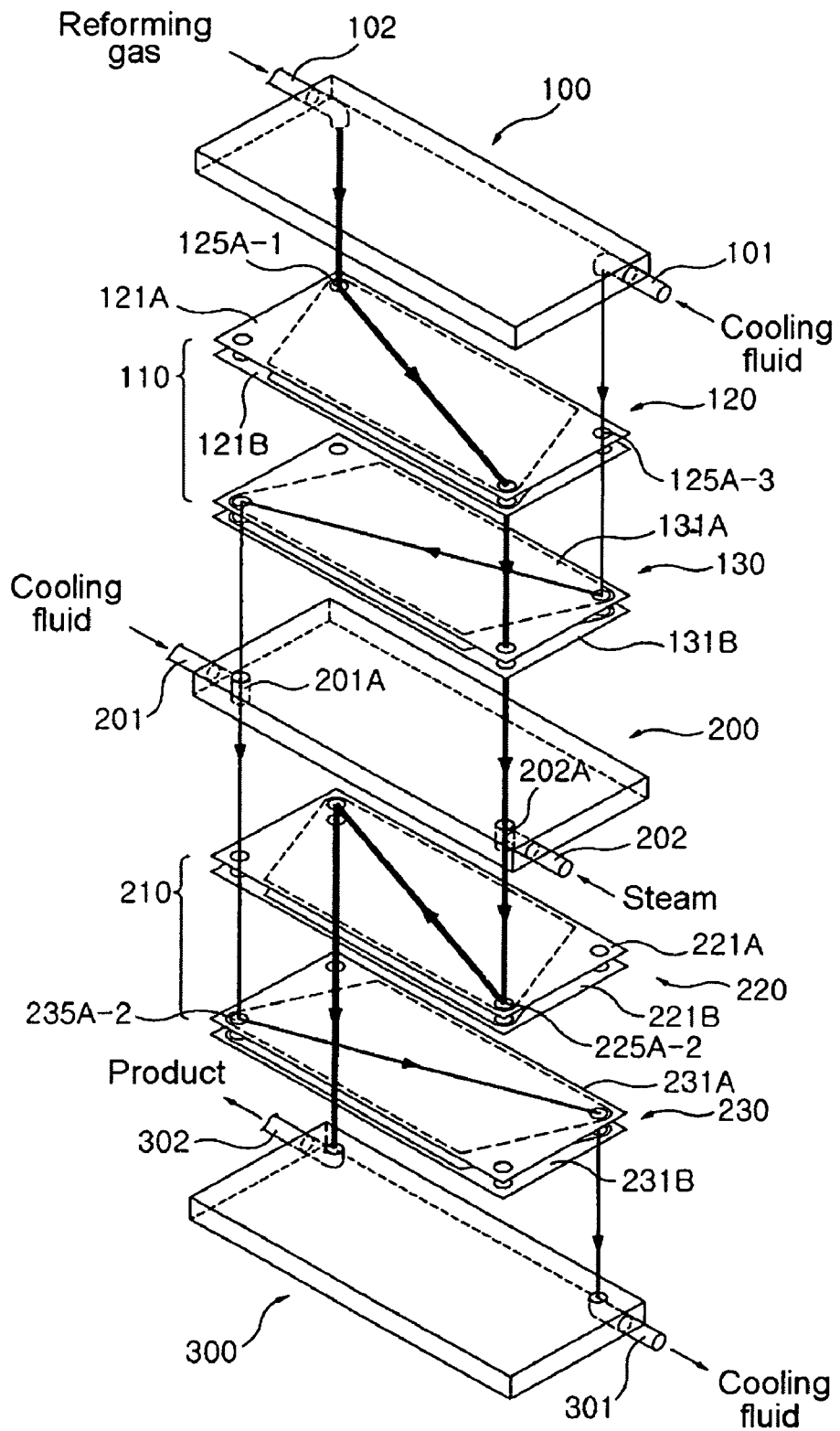
FIG. 1 is an exploded perspective view of a reactor system according to the embodiment of the present invention.

FIG. 1 is an exploded perspective view of a channel reactor system according to the embodiment of the present invention, the channel reactor system according to the embodiment of the present invention comprises an upper end plate 100, an intermediate plate 200, a lower end plate 300, a first channel unit 110 disposed between the upper end plate 100 and the intermediate plate 200 and a second channel unit 210 disposed between the intermediate plate 200 and the lower end plate 300.

As shown in FIG. 1, the upper end plate 100, the first channel unit 110, the intermediate plate 200, the second channel unit 210 and the lower end plate 300 are disposed in a stack structure.

Below, a structure of each structural member constituting the channel reactor system according to the embodiment of the present invention and the connection relation between the structural members are described with reference to the drawings.

Upper End Plate 100

The upper end plate 100 acting as an upper cover of the channel reactor system is a plate-shaped member, a first inlet port 101 and a second inlet port 102 are provided on both sides of the upper end plate 100. Cooling fluid supplied from an external device is introduced into the first inlet port 101 and reaction gas (i.e. reforming gas used in the water-gas shift reaction. Hereinafter, referred to as "reforming gas") supplied from another external device is introduced into the second inlet port 102.

The first inlet port 101 and the second inlet port 102 are connected to the first channel unit 110.

First Channel Unit 110

The first channel unit 110 placed below the upper end plate 100 comprises a reaction channel plate assembly 120 and a heat-exchanging plate assembly 130. The reaction channel plate assembly 120 consists of a first channel plate 121A and a second channel plate 121B having a structure which is identical with that of the first channel plate 121A.

Figure 2:
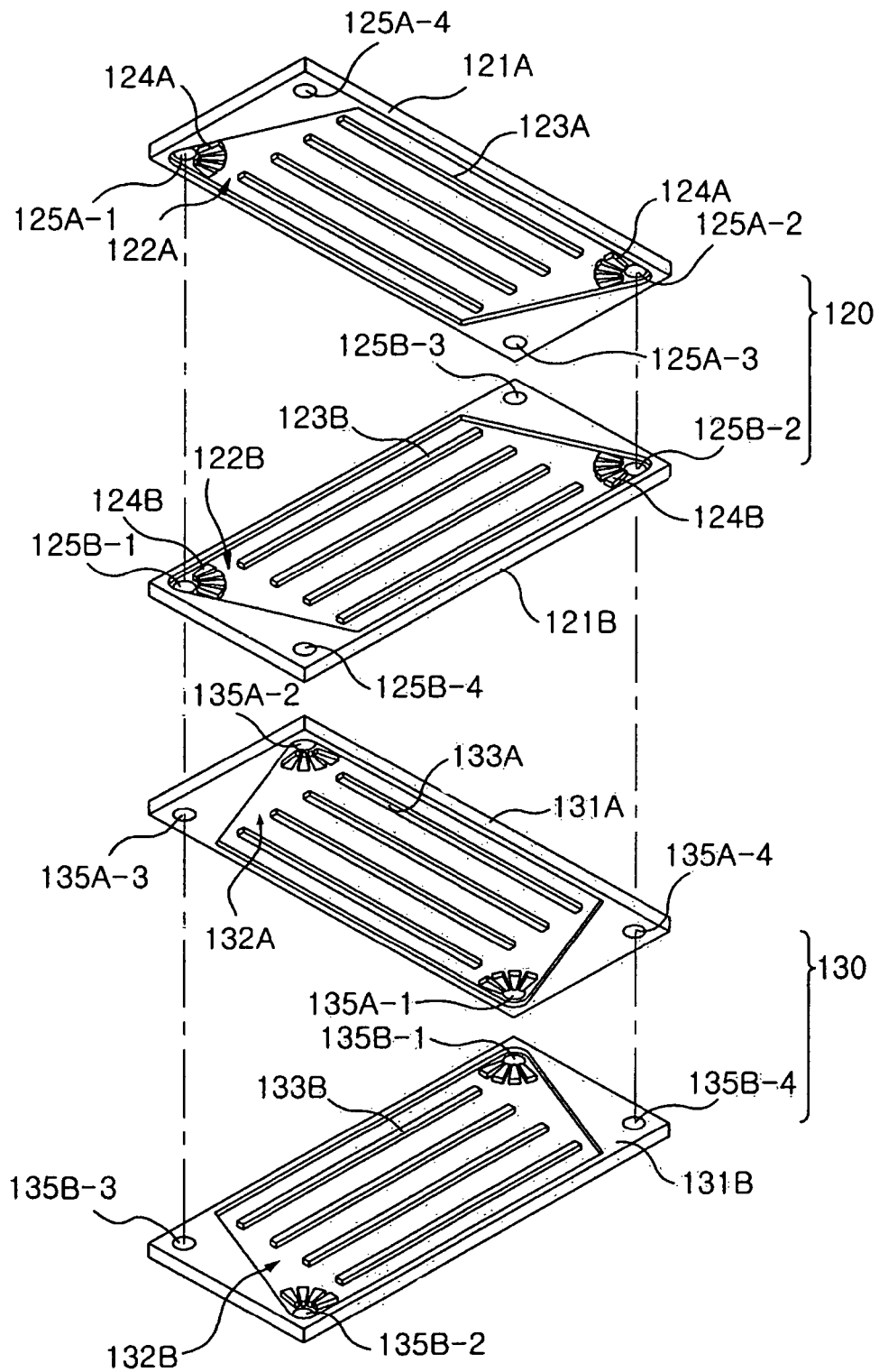
FIG. 2 is an exploded perspective view of a first channel unit shown FIG. 1.

FIG. 2 is an exploded perspective view of the reaction channel plate assembly 120 and the heat-exchanging plate assembly 130 of the first channel unit 110, FIG. 2 shows configurations formed on inner surfaces of a first channel plate 121A and a second channel plate 121B constituting the reaction channel plate assembly 120 and configurations formed on inner surfaces of a first channel plate 131A and a second channel plate 131B constituting the heat-exchanging plate assembly 130.

On the other hand, to illustrate inner surfaces of the first channel plates 121A and 131A and the second channel plates 121B and 131B, FIG. 2 illustrates the first channel plates 121A and 131A seen from the lower side and the second channel plates 121B and 131B seen from the upper side.

In addition, since the structures of the first and second channel plates 131A and 131B of the heat-exchanging channel plate assembly 130 are the same as those of the first and second channel plates 121A and 121B of the reaction channel plate assembly 120, only the structures of the first and second channel plates 121A and 121B of the reaction channel plate assembly 120 are described below.

Figure 3:
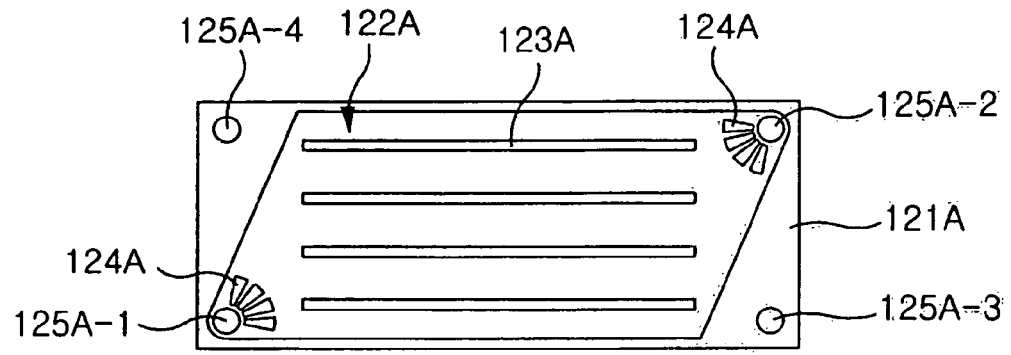
FIG. 3 is a plane view of one channel plate shown in FIG. 2.

As shown in FIG. 3 which is a plane view of the first channel plate 121A of the reaction channel plate assembly 120 shown in FIG. 1 and FIG. 2, a trapezoid shaped recess is formed on an inner surface of the rectangular shaped first channel plate 121A, and so the recess is not extended to both corner portions disposed in one diagonal direction.

A through hole is formed on each of four corner portions of the first channel plate 121A. That is, a first through hole 125A-1 and a second through hole 125A-2 are formed on both corner portions of the recess 122A disposed in the diagonal direction, and a third through hole 125A-3 and a fourth through hole 125A-4 are formed on both corner portions of the area on which the recess 122A is not formed.

Here, a plurality of dispersion pieces 124A are formed around the first through hole 125A-1 and the second through hole 125A-2 formed in the recess 122A, and each of the dispersion pieces 124A is extended toward a central portion of the recess 122A. Also, on a central portion of the recess 122A, a plurality of elongated bars 123A are formed and extended in the lengthwise direction of the first channel plate 121A. The dispersion pieces 124A and the elongated bars 123A have a height which is the same as a depth of the recess 122A.

In the reaction channel plate assembly 120, on the other hand, the second channel plate 121B has a structure which is symmetrical with respect to that of the first channel plate 121A.

If the first channel plate 121A and the second channel plate 121B having the above structures overlap each other, the recess 122A formed on an inner surface of the first channel plate 121A corresponds to a recess 122B formed on an inner surface of the second channel plate 121B, and so a certain space is formed.

Also, the first to fourth through holes 125A-1, 125A-2, 125A-3 and 125A-4 formed on the corner portions of the first channel plate 121A correspond to the first to fourth through holes 125B-1, 125B-2, 125B-3 and 125B-4 formed on the corner portions of the second channel plate 121B, respectively.

In particular, the second through holes 125A-3 and 125B-3 formed on the corner portions on which the recess is not formed and the fourth holes 125A-4 and 125B-4 form a certain passages, respectively.

Figure 5:
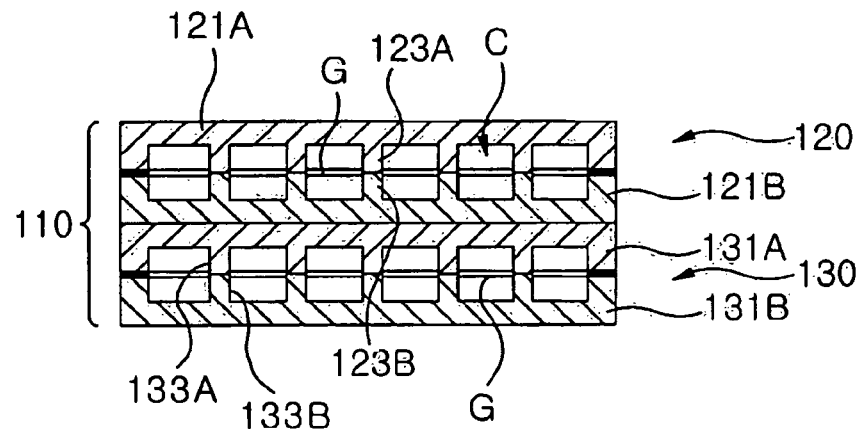
FIG. 5 is a sectional view of a channel unit comprising four channel plates and gaskets, each of the gaskets being disposed between two channel plates.

In addition, the elongated bars 123A and 123B formed on central portions of the recesses 122A and 122B of the first and second channel plates 121A and 121B correspond to and are contacted with each other. In the space formed by the recesses 122A and 122B of the first and second channel plates 121A and 121B, accordingly, a plurality of channels as indicated by reference numeral "C" in FIG. 5 are formed by the elongated bars 123A and 123B.

The heat-exchanging channel plate assembly 130 is placed below the reaction channel plate assembly 120 constructed as above. Like the reaction channel plate assembly, the heat-exchanging channel plate assembly 130 comprises a first channel plate 131A and a second channel plate 131B, each of the first channel plate 131A and the second channel plate 131B has the structure which is the same as that of each of the first channel plate 121A and the second channel plate 121B constituting the reaction channel plate assembly 120.

However, the heat-exchanging channel plate assembly 130 is disposed such that the heat-exchanging channel plate assembly is turned upside down with respect to the reaction channel plate assembly 120, and so the first and second through holes 135A-1, 135B-1 and 135A-2, 135B-2 formed in the recesses 132A and 132B of the channel plates 131A and 131B of the heat-exchanging channel plate assembly 130 correspond to the third and fourth through holes 125A-3, 125B-3 and 125A-4, 125B-4 formed out of the recesses 122A and 122B of the channel plate 121A and 121B of the reaction channel plate assembly 120.

As shown in FIG. 1, on the other hand, the first through hole 125A-1 formed on a corner of the recess 122A of the first channel plate 121A of the reaction channel plate assembly 120 is connected to the second inlet port 102 of the upper end plate 120, and the third through hole 125A-3 formed on the first channel plate 121A of the reaction channel plate assembly 120 is connected to the first inlet port 101 of the upper end plate 120.

Accordingly, reforming gas introduced into the second inlet port 102 of the upper end plate 100 is supplied into the space formed between the first channel plate 121A and the second channel plate 121B via the first through hole 125A-1 formed on a corner of the recess 122A of the first channel plate 121A of the reaction channel plate assembly 120.

Reforming gas supplied into the space is flowed along the channels ("C" in FIG. 5) formed by the elongated bars 123A and 123B of the first and second channel plates 121A and 121B, and then discharged through the second through hole 125-B formed on a corner of the recess 122B of the second channel plate 121B.

On the other hand, a catalyst layer is formed on an inner surface of each of the first and second channel plates 121A and 121B (that is, a surface of each channel) of the reaction channel plate assembly 120. The catalyst employed in the present invention is cerium (Ce)-zirconium (Zr) oxide catalyst containing platinum of 1 to 2 wt % and rhenium (Re) of 1 to 2 wt %.

Simultaneously, cooling fluid introduced into the first inlet port 101 of the upper end plate 100 is passed through the third through holes 125A-3 and 125B-3 of the reaction channel plate assembly 120 and then flowed in a space formed between the first channel plate 131A and the second channel plate 131B through a first through hole 135A-1 formed at a corner of a recess of the first channel plate 131A of the heat-exchanging channel plate assembly 130.

Then, cooling fluid is flowed along channels formed by elongated bars 133A and 133B of the first and second channel plates 131A and 131B and then discharged from via a second through hole 135B-2 formed at a corner of the recess 132B of the second channel plate 131B.

On the other hand, fourth through holes 135A-4, 135B-4 of the first and second channel plates 131A and 131B of the heat-exchanging channel plate assembly 130 correspond to the second through hole 125B-2 of the second channel plates 121B of the reaction channel plate assembly 120, and so reforming gas discharged from the reaction channel plate assembly 120 is discharged to an exterior through the fourth through holes 135A-4 and 135B-4 of the heat-exchanging channel plate assembly 130.

Intermediate Plate 200

The intermediate plate 200 disposed below the first channel unit 110 has a first inlet port 201 and a second inlet port 202 formed both side portions thereof. Cooling fluid is flowed into the first inlet port 201 and steam is flowed into the second inlet port 202. The inlet ports 201 and 202 are connected to first and second fluid passages 201A and 202A penetrating the intermediate plate 200, respectively.

On the other hand, the first fluid passage 201A connects the second through hole 135B-2 of the heat-exchanging channel plate assembly 130 constituting the upper first channel unit 110 and a second through hole 235A-2 of a first channel plate 231A of a heat-exchanging channel plate assembly 230 of the lower second channel unit 210.

In addition, the second fluid passage 202A connects the second through hole 125B-2 of the reaction channel plate assembly 120 constituting the upper first channel unit 110 and a second through hole 225A-2 of a first channel plate 221A of a reaction plate assembly 220 of the lower second channel unit 210.

Here, the second fluid passage 202A is connected to the second through hole 125B-2 of the reaction channel plate assembly 120 through the corresponding through holes 135A-4 and 135B-4 of the heat-exchanging plate assembly 130 of the first channel unit 110.

Second Channel Unit 210

The second channel unit 210 placed below the intermediate plate 200 comprises the reaction channel plate assembly 220 and the heat-exchanging plate assembly 230. Here, the reaction channel plate assembly 220 and the heat-exchanging plate assembly 230 constituting the second channel unit 210 have the structures which are the same as those of the reaction channel plate assembly 120 and the heat-exchanging plate assembly 130 constituting the first channel unit 110. Accordingly, a detail description thereon is omitted.

Lower End Plate 300

The lower end plate 300 placed below the second channel unit 210 has a first outlet port 301 and a second outlet port 302 provided on both sides thereof. Cooling fluid is discharged from the first outlet port 301 and reaction product is discharged from the second outlet port 302. The first and second outlet ports 301 and 302 are connected to the first and third through holes (although not shown in the drawings, but have the structures which are the same as those of the first and third through holes 135B-1 and 135B-3 of the second channel plate 131B of the heat-exchanging plate assembly 130 in FIG. 2) of the second channel plate 231B of the heat-exchanging plate assembly 230 constituting the second channel unit 210.

A flow of reforming gas and a flow of cooling fluid in the channel reactor system constituted as described above are illustrated with reference to the drawings. For convenience sake, on the other hand, a flow of reforming gas is represented by a thick solid line and a flow of cooling fluid is represented by a thin solid line in FIG. 1.

A number of through holes (not shown) are formed on the upper end plate 100, the intermediate plate 200 and the lower plate 300, and a heating means (for example, a heater) is provided in each through hole. Accordingly, heat required for the reaction is supplied to the upper end plate 100, the intermediate plate 200 and the lower plate 300.

Under this condition, reforming gas introduced into the second inlet port 102 of the upper end plate 100 is flowed into the reaction channel plate assembly 120 of the first channel unit 110 through the path described above.

As described above, the space formed between the first channel plate 121A and the second channel plate 121B of the reaction channel plate assembly 120 is divided into a plurality of channels ("C" in FIG. 5), and so reforming gas is flowed along the entire surfaces of the first channel plate 121A and the second channel plate 121B.

In this process, reforming gas and steam are reacted with each other on the catalyst layers formed on inner surfaces of the first and second channel plates 121A and 121B in a high temperature condition made by heat supplied from the upper end plate 100.

Reforming gas reacted with steam on the catalyst layer is discharged from the reaction channel plate assembly 120, and then flowed into the second fluid passage 202A of the intermediate plate 200 through the fourth through holes 135A-4 and 135B-4 formed on corners of the first channel plate 131A and the second channel plate 131B of the heat-exchanging channel plate assembly 130 of the first channel unit 110. At this time, reforming gas is mixed with steam supplied from the second inlet port 202 of the intermediate plate 200.

Then, reforming gas is introduced into the reaction channel plate assembly 220 of the second channel unit 210. A flow of reforming gas in the reaction channel plate assembly 220 of the second channel unit 210 is substantially identical with that of reforming gas in the reaction channel plate assembly 120 of the first channel unit 110.

Reforming gas and steam are reacted with each other on the catalyst layers formed on inner surfaces of the first and second channel plates 221A and 221B constituting the reaction channel plate assembly 220 of the second channel unit 210, reaction product of reforming gas produced by the above reaction is passed through the through holes formed at corners of the heat-exchanging channel plate assembly 230 of the second channel unit 210 and then discharged to an outside through the second outlet port 302 of the lower end plate 300.

Along with a flow of reforming gas as described above, cooling fluid introduced into the first inlet port 101 of the upper end plate 100 is flowed in the heat-exchanging plate assembly 130 of the first channel unit 110. That is, cooling fluid is flowed into the space formed between the first channel plate 131A and the second channel plate 131B of the heat-exchanging plate assembly 130 through the third through holes 125A-3 and 125B-3 of the first and second channel plates 121A and 121B constituting the reaction channel plate assembly 120.

As described above, the space formed between the first channel plate 131A and the second channel plate 131B of the heat-exchanging plate assembly 130 is divided into a plurality of channels (represented by "C" in FIG. 5), and so cooling fluid is flowed along the channels C. In the above process, a heat exchange is performed between the heat-exchanging channel plate assembly 130 and the reaction channel plate assembly 120 in which a catalytic reaction between forming gas and steam is generated.

Cooling fluid which is heat-exchanged with the reaction channel plate assembly is flowed to the first fluid passage 201A of the intermediate plate 200. At this time, cooling fluid is mixed with new cooling fluid supplied through the first inlet port 201 of the intermediate plate 200.

Thereafter, cooling fluid is passed through the third through holes formed on the first and second channel plates 221A and 221B of the reaction channel plate assembly 220 of the second channel unit 210, and then introduced into the space formed between the first and second channel plates 231A and 231B of the heat-exchanging channel plate assembly 230.

Like the heat-exchanging channel plate assembly 130 of the first channel unit 110, the space formed between the first channel plate 231A and the second channel plate 231B of the heat-exchanging plate assembly 230 of the second channel unit 210 is divided into a plurality of channels. Due to cooling fluid which is flowing along these channels, a heat-exchange is performed between the heat-exchanging channel plate assembly 230 and the reaction channel plate assembly 220.

Cooling fluid which is heat-exchanged with the reaction channel plate assembly is finally discharged to an exterior through the first outlet port 301 formed on the lower end plate 300.

Figure 4:
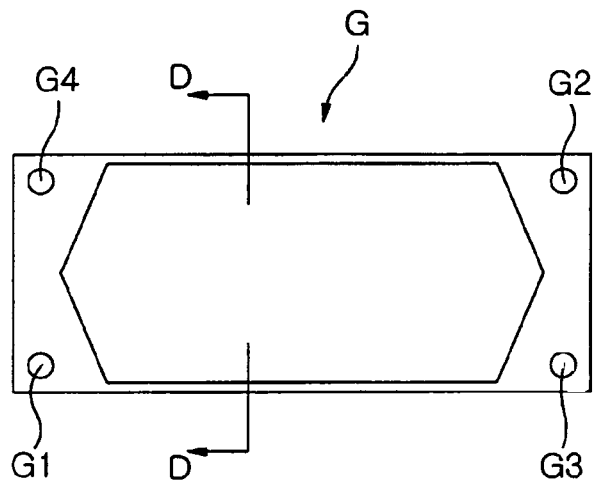
FIG. 4 is a plane view of a gasket disposed between two channel plates.

On the other hand, FIG. 4 is a plane view of a gasket G disposed between two channel plates (for example, 121A and 121B, and 131A and 131B in FIG. 1) and FIG. 5 is a sectional view of the channel unit 110 comprising four channel plates 121A, 121B and 131A, 131B and two gaskets G, each of which being disposed between two channel plates.

Here, FIG. 5 is a sectional view taken along a widthwise direction of the gasket G (that is, the line D-D in FIG. 4) and shows a position of each gasket G and the channels C formed between the channel plate 121A and 121B by the elongated bars 123A and 123B and between the channel plate 131A and 131B by the elongated bars 133A and 133B.

In the first channel unit 110, the first and second channel plates 121A and 121B of the reaction channel plate assembly 120 forming the space in which reforming gas is flowing and/or the first and second channel plates 131A and 131B of the heat-exchanging channel plate assembly 130 forming the space in which cooling fluid is flowing are coupled to each other by means of a coupling means (not shown), and so a micro clearance may be formed between the first and second channel plates 121A and 121B or/and between the first and second channel plates 131A and 131B.

While reforming gas and/or cooling fluid is flowing in the space between first and second channel plates 121A and 121B (and/or 131A and 131B), reforming gas and/or cooling fluid may be leaked through this clearance. To prevent reforming gas and/or cooling fluid from being leaked, it is preferable to provide the gasket G between the first and second channel plates 121A and 121B of the reaction channel plate assembly 120 and/or between the first and second channel plates 131A and 131B of the heat-exchanging channel plate assembly 130. At this time, each gasket G should have a plurality of through holes G1, G2, G3 and G4 formed at corner portions thereof and corresponding to the through holes of the channel plates 121A, 121B and 131A, 131B.

Below, the preferred embodiment of the present invention is described. The below embodiment is merely illustratively explained, it should be understood that the present invention is not limited to the below embodiment.

Example

An inner surface of each of the channel plates 121A, 121B and 221A, 221B of the reaction channel plate assemblies 120 and 220 (in FIG. 1) was coated with 5 grams of catalyst containing platinum of 1.8 wt % and Re/CeZrO$_2$ of 1.7 wt % as water-gas shift catalyst.

Ten (10) channels (C in FIG. 5) were formed in the inner space of each of the channel plate assemblies 120 and 130, and five (5) reaction channel plate assemblies (120 in FIG. 1) and six (6) heat-exchanging channel plate assemblies (130 in FIG. 1) were disposed between the upper end plate 100 and the intermediate plate 200. Five (5) reaction channel plate assemblies (230 in FIG. 1) and six (6) heat-exchanging channel plate assemblies (230 in FIG. 1) were disposed between the intermediate plate 200 and the lower end plate 300.

The channel reactor system constituted as above was connected to an autothermic reforming reactor. Methane with a flow rate of 100 cc/min., air with a flow rate of 200 cc/min. and steam with a flow rate of 200 cc/min. were introduced into the autothermic reforming reactor, and reforming gas which is the reaction product of above materials was introduced the channel reactor system.

Steam and reforming gas containing hydrogen of 50 wt %, carbon dioxide of 10 wt %, nitrogen of 30 wt % and carbon monoxide of 10 wt % were supplied into the second inlet port of the upper end plate of the channel reactor system with a flow rate of 200 cc/min. and steam with a flow rate of 112 cc/min. was additionally supplied through the second inlet port of the intermediate plate. In addition, air acting as cooling fluid with a flow rate of 30 cc/min. was supplied through the first inlet port of the upper end plate.

Under the above conditions, the channel reactor system was operated and controlled such that a temperature of the channel reactor system was maintained at 300 degree Celsius.

As a result, a gas composition of the reaction product discharged through the lower end plate was hydrogen of 57.99 wt %, nitrogen of 24.39 wt %, carbon dioxide of 16.06 wt %, carbon monoxide of 0.54 wt % and methane of 1.02 wt %.

Although the preferred embodiment have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and appended claims. In addition to variations and modifications in the component parts and/or arrangements, alternative uses will also be apparent to those skilled in the art.

For example, the above description and the drawings illustrate that single channel unit consisting of the reaction channel plate assembly and the heat-exchanging channel plate assembly is disposed between two plates (the upper plate and the intermediate plate, and the intermediate plate and the lower plate), however, two or more channel units may be disposed.

Industrial Applicability

Since the water-gas shift reaction is performed in the channel reactor system according to the present invention as described above, a heat-exchange and a control of heat can be easily performed. And, since the channel reactor system according to the present invention has the structure that the heat-exchanging channel plate assembly is disposed adjacently to the reaction channel plate assembly, there is no need to provide an additional member such as a pipe for coupling a cooling means to the reactor so that a thermal efficiency of the system can be remarkably enhanced.

The invention claimed is:
1. A channel reactor system, comprising;
   at least two channel units into which reaction gas and cooling fluid are separately introduced, each channel unit comprising a reaction channel plate assembly into which reaction gas is introduced and a heat-exchanging channel plate assembly into which cooling fluid is introduced; and at least one intermediate plate disposed between the upper and lower channel units, the intermediate plate supplying new reactant and cooling fluid to reaction gas and cooling fluid inflowed from the upper channel unit and supplying reaction gas and cooling fluid to the reaction channel plate assembly and the heat-exchanging channel plate assembly of the lower channel unit, respectively.

2. The channel reactor system according to claim 1, further comprising an upper end plate being disposed on the uppermost channel unit to supply reaction gas to the reaction channel plate assembly and cooling fluid to the heat-exchanging channel plate assembly of the upper channel unit; and a lower end plate disposed below the lowermost channel unit, the lower end plate being provided for discharging reaction product discharged from the reaction channel plate assembly and discharging cooling fluid discharged from the heat-exchanging plate assembly of the lowermost channel unit.

3. The channel reactor system according to claim 1, wherein the intermediate plate comprises;

a first inlet port to which cooling fluid is introduced;

a second inlet port to which reactant is introduced;

a second fluid passage connecting the reaction channel plate assembly of the upper channel unit, the second inlet port and the reaction channel plate assembly of the lower channel unit; and a first fluid passage connecting the heat-exchanging channel plate assembly of the upper channel unit, the first inlet port and the heat-exchanging channel plate assembly of the lower channel unit.

4. The channel reactor system according to claim 3, wherein the upper end plate, the intermediate plate and the lower end plate have a heating means mounted thereto.

5. The channel reactor system according to claim 1, wherein each of the reaction channel plate assembly and the heat-exchanging plate assembly of the channel unit comprises a first channel plate and a second channel plate, each channel plate has a recess formed on an inner surface thereof and a plurality of elongated bars formed in the recess to form a plurality of fluid flow channels between the first and second channel plates by means of the elongated bars when the first and second channel plates are coupled to each other.

6. The channel reactor system according to claim 5, wherein each of the first and second channel plates of the reaction channel plate assembly has through holes formed on a periphery of the recess for passing cooling fluid and through holes formed on portions of the recess for inflowing and discharging reaction gas.

7. The channel reactor system according to claim 6, further comprising a plurality of dispersion pieces formed around each through hole provided in the recess, the dispersion piece being directed to a central portion of the recess.

8. The channel reactor system according to claim 5, wherein each of the first and second channel plates of the heat-exchanging channel plate assembly has through holes formed on a periphery of the recess for passing reaction gas and through holes formed on portions of the recess for inflowing and discharging cooling fluid.

9. The channel reactor system according to claim 8, further comprising a plurality of dispersion pieces formed around each through hole provided in the recess, the dispersion piece being directed to a central portion of the recess.

10. The channel reactor system according to claim 5, further comprising gaskets being placed between the first channel plate and the second channel plate of the reaction channel plate assembly and between the first channel plate and the second channel plate of the heat-exchanging channel plate assembly.

11. The channel reactor system according to claim 5, wherein the first and second channel plates of the reaction channel plate assembly have catalyst layers formed on inner surfaces thereof.

12. The channel reactor system according to claim 11, wherein reaction gas supplied into the reaction channel plate assembly is reforming gas for the water-gas shift reaction, and the catalyst layer is water-gas shift catalyst layer and is formed of cerium (ce)-zirconium (zr) oxide catalyst containing platinum of 1 to 2 wt % and rhenium (re) of 1 to 2 wt %.

* * * * *